3,795,523
Patented Mar. 5, 1974

3,795,523
SILVER HALIDE CONTAINING VARIABLE-TRANSMITTANCE BOROSILICATE GLASS
Yoshiro Moriya, Takamichi Kawamoto, Hiroshi Tanaka, and Tsutomu Ueno, Osaka, Japan, assignors to Agency of Industrial Science & Technology, Tokyo, Japan
Continuation of abandoned application Ser. No. 74,709, Sept. 23, 1970. This application July 5, 1972, Ser. No. 270,104
Claims priority, application Japan, Sept. 26, 1969, 44/77,030
Int. Cl. C03c 3/06, 3/08, 3/26
U.S. Cl. 106—54                              3 Claims

ABSTRACT OF THE DISCLOSURE

A variable-transmittance glass, having a high response speed to light, consisting essentially of 50–70% of $SiO_2$, 10–26% of $B_2O_3$, 6–14% of $Al_2O_3$ and 5–15% of alkali metal oxides including $K_2O$ and $Li_2O$ in a ratio of from 1:0.1 to 1:0.7, with the content of other alkali metal oxides kept below the $Li_2O$ content, all of which make a total of 100%, plus 0.05–1.0% of Ag, at least an equivalent percentage of at least one halogen to the percentage of Ag to form silver halide crystals, and 0.005–0.03% of CuO, all percentages being by weight.

REFERENCE TO RELATED APPLICATION

Figure 1:
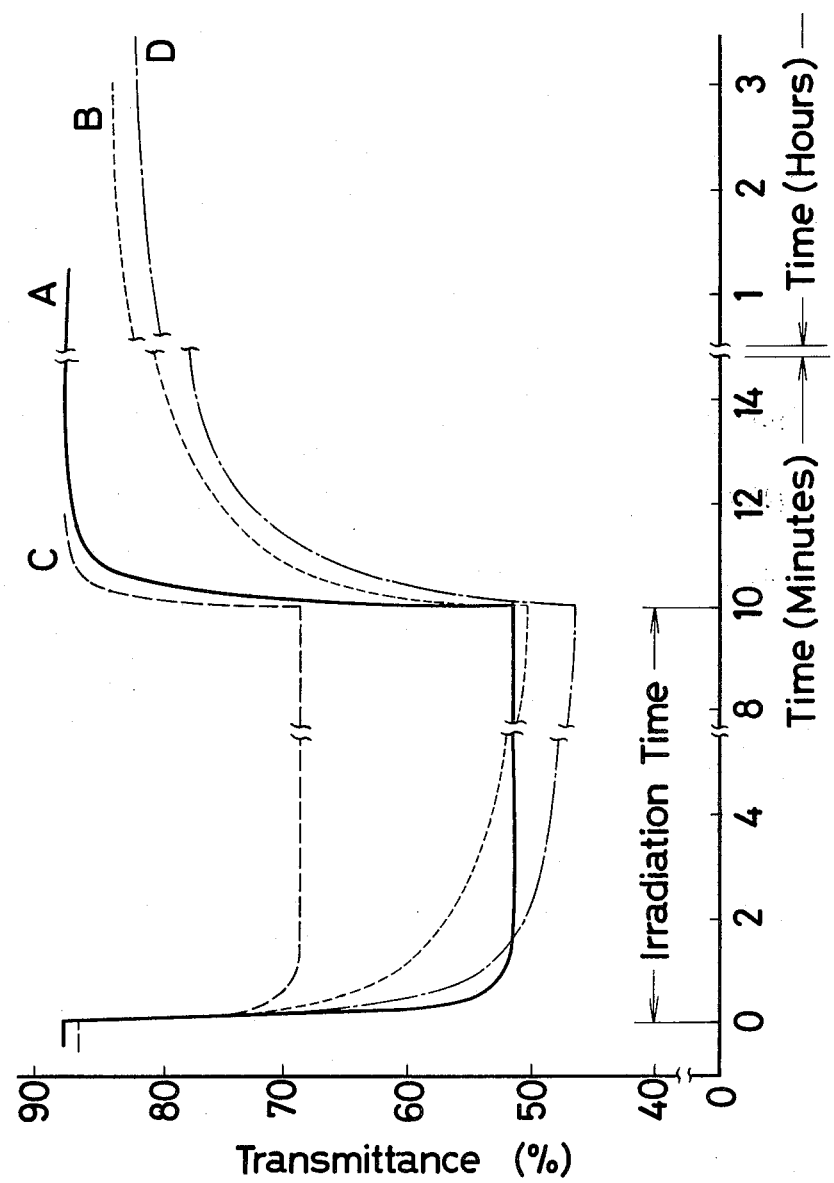

This is a continuation of our copending application Ser. No. 74,709, filed Sept. 23, 1970, now abandoned.

This invention relates to a variable-transmittance glass, namely, a glass which has its transmittance reduced upon exposure to ultraviolet rays or visible rays of short wavelengths (hereinafter referred to simply as "light") but resumes the original transmittance when irradiation is discontinued. The glass of this invention is prepared by mixing and melting $SiO_2$, $B_2O_3$, alkali metal oxide, CuO, halogen compounds and silver compounds in a specific range of ratios, heating the resultant glass composition at a temperature between the transformation point and the softening point hereof hereby bringing it into the initial state of phase separation free from turbidity, allowing halide ions and silver ions to be transferred into one of the glass phases and subsequently maintaining the glass composition at a temperature below the melting point of the crystals of silver halide thereby allowing the crystals of silver halide to ripen within the aforementioned glass phase.

Variable-transmittance glass has a property such that it assumes a darkened state upon exposure to light but is deprived of the darkened state and resumes its original transmittance when irradiation is discontinued. Spectacles which make use of this property are now available on the market. The mechanism responsible for the variation in transmittance in the variable-transmittance glass due to light exposure is related to the photodecomposition reaction of very fine silver halide (hereinafter referred to as AgX) crystals formed within the glass. On exposure to light, the very fine AgX crystals formed within the glass undergo photodecomposition and give rise to photodecomposition products and these photodecomposition products impede the penetration of light and, consequently, reduce the transmittance of the glass. On the other hand, since AgX crystals are enclosed within inactive, impermeable glass, the aforementioned photodecomposition products of the AgX crystals occur within the crystals or in the immediate neighborhood thereof. When no longer irradiated, therefore, the photodecomposition products are recomposed thermally. As a consequence, the transmittance of the glass returns to its original level.

Accordingly, the speed at which the transmittance of the variable-transmittance glass is reduced upon exposure to light and the speed at which it is returned to its original level upon discontinuation of irradiation (hereinafter referred to collectively as "response speed"), particularly the speed which the transmittance returns to its original level upon discontinuation of irradiation (hereinafter referred to specifically as "fading rate"), are influenced largely by the kind and the size of the AgX crystals as well as by the composition of the glass which encloses the AgX crystals.

Variable-transmittance glasses manufactured by conventional methods are not satisfactory from the standpoint of practical use, because they are extremely slow in response speed, particularly in fading rate, tend to grow turbid and show inferior darkening upon exposure to light.

A usual practice followed to date for treating variable-transmittance glass to improve its property to darken upon exposure to light is to heat the glass at a temperature above the transformation point thereof for a long time. By the application of heat, the glass is first separated into a glass phase having high viscosity and a glass phase having low viscosity. In this case, more silver ions and halide ions are transferred to the low-viscosity glass phase and concentrated in that phase in proportion to the degree of phase separation (or to the length of heating time where the heating is carried out at a fixed temperature). As a result, chances of collision between silver ions and halide ions are increased, making easy the formation of molten AgX. During the cooling of the glass from the heating temperature to normal room temperature, the molten AgX converts itself into AgX crystals and consequently confers photosensitivity to the glass. If the phase separation is allowed to progress sufficiently for the purpose of causing as many silver ions and halide ions as possible to be concentrated within the low-viscosity glass phase and form therein a large number of AgX crystals, the glass grows turbid and the production of a transparent variable-transmittance glass is obstructed.

Further, the response speed of the variable-transmittance glass is markedly influenced by the composition of the glass which encloses the AgX crystals, particularly by the kind and the concentration of alkali ions in the glass. Assuming that the other glass constituents are contained at a fixed percentage composition, presence of alkali ions having a large ionic radius offers the advantage of heightening the fading rate of the variable-transmittance glass which has its transmittance reduced as a consequence of exposure to light but, in contrast, presents the disadvantage of tending to lower the degree of darkening due to photosensitivity and increase the viscosity of glass. To obtain a glass of homogeneous quality free from bubbles, the melting is required to be performed at a high temperature for a long time. Such a melting process causes volatilization of halogen and silver, partial reduction of silver ions and other undesirable phenomena. By contrast, presence of alkali ions with a small ionic radius proves advantageous in that it increases the degree of darkening of the variable-transmittance glass upon exposure of the glass to light and, at the same time, lowers the viscosity of the glass melt and consequently facilitates the melting of glass. On the other hand, however, the presence of such alkali ions proves disadvantageous in that the fading rate is lowered and the glass incorporating halides therein is more likely to induce turbidity on.

Taking note of the aforementioned effects of the alkali ions ascribable to the ion size, the inventors have pursued research on the coexistence of alkali ions having a large ionic radius and those having a small one. Numerous experiments have led the inventors to the following discovery: That the combined use of $Li_2O$ and $Na_2O$ brings about no appreciable improvement in the response speed of glass to light as compared with the independent use of $Na_2O$ but rather probes disadvantageous because of an increased toward turbidity in the glass on heat treatment; that the combined use of $K_2O$ with $Na_2O$ is similarly unsuitable because it degrades the property of the glass to decrease transmittance upon exposure to light as compared with the independent use of $Na_2O$; that the combined use of $Rb_2O$ or $Cs_2O$ with other alkali oxides, despite the use of expensive raw materials, fails to manifest any marked effect ascribable to the combined use; and that the combined use of $Li_2O$ with $K_2O$ can contribute to effective utilization of the desirable effects of alkali ions having large and small ionic radii only when the ratio between the two oxides is fixed within a specific range.

A main object of this invention resides in providing a variable-transmittance glass having a high response speed by allowing $Li_2O$, $K_2O$ and other metal oxides to coexist in a specific range of ratios.

Figure 2:
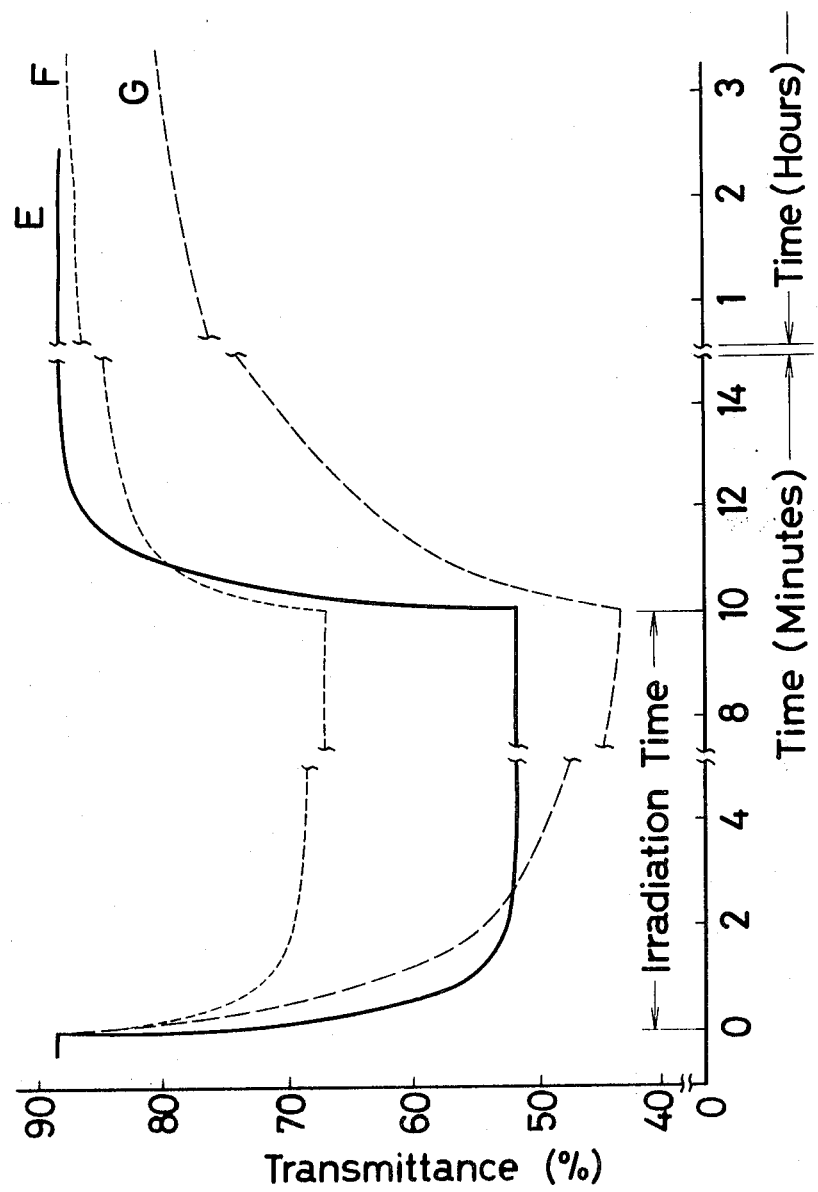

FIG. 1 and FIG. 2 show the variations in transmittance observed during and after exposure to xenon lamp in the glasses manufactured according to the present invention in comparison with those observed under the same condition in other glasses.

In the present invention, the glass is composed of 50–70% by weight of $SiO_2$, 10–26% by weight of $B_2O_3$, 6–14% by weight of $Al_2O_3$ and 5–15% by weight of alkali metal oxides (provided that $Li_2O/K_2O$ equals from 0.1 to 0.7 and the combined content of the other alkali metal oxides does not exceed the content of $Li_2O$), all of which make a total of 100% by weight, plus 0.05–1.0% by weight of Ag and a mole equivalent to or greater than the weight of said Ag of one or more kinds of halides, and 0.005–0.03% by weight of CuO.

The aforementioned specific composition has been fixed for $SiO_2$, $B_2O_3$, $Al_2O_3$ and alkali metal oxides for the reason that the separation into the glass phase consisting chiefly of $SiO_2$ (hereinafter referred to as "glass phase I") and the glass phase having the principal constituents of $B_2O_3$, $Al_2O_3$ and alkali metal oxides (hereinafter referred to as "glass phase II") can be made easy by suitable selection of heating temperature and heating time and that a transparent, phase-separated glass (in the initial state of phase separation) having a phase-separated structure of a short cycle of composition variation can be obtained easily by heat treatment at the temperature between the transformation point and the softening point. Moreover, so far as the glass has a composition which falls within the above-specified range of this invention, silver ions and halide ions are transferred into the glass phase II having a transformation point lower than the melting point of the AgX crystals even when the glass is in the initial state of phase separation.

The coexistence of $Li_2O$ and $K_2O$ is intended to make the most of the behavior of $K^+$ ions to increase the fading rate in combination with that of $Li^+$ ions to enhance the degree of darkening. As to the amounts of $Li_2O$ and $K_2O$ to be added, a $Li_2O/K_2O$ ratio below the level of 0.1 is not desirable because the degree of darkening is insufficient despite an increased fading rate and the ratio beyond the level of 0.7 is undesirable because the glass tends to suffer from turbidity on heat treatment. Thus, the ratio of $Li_2O/K_2O$ is fixed within the range of 0.1 to 0.7, wherein there can be obtained a glass having an extremely high response speed to light with very little possibility of turbidity caused by phase separation.

Where alkali metal oxides other than $K_2O$ and $Li_2O$ are present, the effects of the combined use of $K_2O$ and $Li_2O$ are not affected so far as the combined weight of such alkali oxides does not exceed the weight of $Li_2O$.

The content of CuO has been fixed within the range of 0.005 to 0.03% by weight for the reason that CuO of this concentration serves to further enhance the effects of darkening and fading by the glass.

Now, the glass of this specific range of composition which has not yet undergone the heat treatment is heated at a temperature above the transformation point but not exceeding the softening point of the glass for a period of time not sufficient for inducing turbidity in the glass, with the result that the glass is brought into the initial state of phase separation.

As the second stage of heat treatment, the glass in this initial state of phase separation is retained at a temperature below the melting point of the AgX crystals (the highest melting point is had where two or more kinds of halogens are present) for a prescribed length of time, so as to allow silver ions and halide ions to be combined and consequently effect the formation and growth of the AgX crystals. At the temperature at which the second-stage heat treatment is performed, the phase separation of glass makes very little progress and, as a consequence, silver ions and halide ions can be diffused at a sufficiently high speed without the glass suffering from turbidity. This means that the AgX crystals can be formed amply. Further, the size of crystals can be controlled by suitably selecting the length of heat treatment.

Thus, the present invention enables manufacture of a transparent variable-transmittance glass capable of high degree of darkening and high fading rate by subjecting a glass having a composition within the specific range of this invention and having the $Li_2O/K_2O$ ratio in a fixed range to heat treatment in two separate stages under specific conditions.

Compared with conventional products, the variable-transmittance glass obtained by this invention has an extremely high response speed (particularly a high fading rate) and thus finds extensive use as lenses for spectacles, as windshields for automobiles and other transportation media and window glass in the control of photochemical reactions in the chemical industry, etc.

The present invention is described in further detail with respect to the preferred embodiments which are cited below purely for the purpose of illustration. They should not be construed as limiting the present invention.

EXAMPLE 1

A mixture comprising silica sand, aluminum hydroxide, boric acid, potassium carbonate, lithium carbonate, silver nitrate, sodium chloride, potassium chloride, potassium bromide and copper oxide was melted in a platinum crucible, retained at 1400° C. for two hours, stirred at the same temperature for one hour, and subsequently molded into the shape of a plate. Thus was obtained a glass plate having the composition and the transformation point shown in Table 1(I).

For the purpose of comparing the variation in transmittance, another glass (II) plate described in Table 1 was manufactured by using sodium carbonate in the place of the potassium carbonate and lithium carbonate in the aforementioned composition of raw materials.

The glass (I) and (II) plates thus obtained were given a thickness of 2 mm., subjected to heat treatment under varying conditions to induce formation of silver halide crystals, cooled to room temperature, and thereafter exposed, while at 20° C., to a beam from a xenon lamp impinging on the surface thereof at an angle of 45° from the forward side and simultaneously to a beam of light having a wavelength exceeding 500 m$\mu$ and impinging on the surface at an angle of 90° with reference to the incident beam from the said xenon lamp on the plate (namely, in the symmetrical inclination of 45° with reference to the surface of plate) for 10 minutes so as to determine the variation in the transmittance of glass at 550 m$\mu$. The results are shown in FIG. 1.

The curve A represents the results of the variation in transmittance determined for the glass I of Table 1, which was heated at 580° C. for one hour in the first-stage treatment, then lowered to 450° C. and retained at that temperature for 15 hours in the second-stage treatment, thereafter cooled to room temperature, and subjected to the aforementioned exposure test at 20° C.

In the variable-transmittance glass manufactured according to this invention, the transmittance was 88% at first, fell sharply to 56.8% after 30 seconds of exposure to xenon lamp and reached 52.2% after one minute 30 seconds of exposure and thereafter remained at that level because of saturated darkening.

After the irradiation was discontinued, the transmittance quickly rose to 81.5% in 30 seconds, 84.7% in one minute and 87% in two minutes respectively. In three minutes from the time of discontinuation of irradiation, it returned to the level of 88% which had existed prior to the exposure.

The curve B represents the results of the variation in transmittance determined for the glass II of Table 1, which was heated at 580° C. for one hour, cooled to room temperature and thereafter subjected to the exposure in the same procedure as mentioned above at 20° C. In the case of this glass, the transmittance was 88% at first, fell to 64.1% after 30 seconds of exposure to xenon lamp and 55% after three minutes of exposure, and reached 50.4% after 10 minutes of exposure while the degree of darkening was not quite saturated. Indications were that the transmittance would continue to fall if the irradiation continued. After the irradiation was discontinued, the transmittance rose gradually to 66.9% in 30 seconds, to 71% in one minute and to 81.5% in 10 minutes. However, more than three hours were required for the transmittance to return completely to the level 88% which had existed prior to the exposure.

The curve C represents the results of the variation in transmittance determined for the glass I of Table 1, which was heated at 580° C. for one hour, cooled to room temperature and thereafter subjected to the exposure in the same procedure as mentioned above at 20° C. In this glass, the transmittance was 88% at first, fell to 69.6% after 30 seconds of exposure to the xenon lamp and reached the saturated darkening level of 68.7% after one minute of exposure. After this point, the transmittance remained unaffected while the irradiation continued. After the irradiation was discontinued, the transmittance rose sharply to 85.6% in 30 seconds and to 87% in one minute and, in one minute 30 seconds, returned completely to the level of 88% which had existed prior to the exposure.

From FIG. 1, it is clear that the variable-transmittance glass manufactured according to this invention has an extremely high response speed, particularly high fading rate, and enjoys excellent properties.

The curve D given in FIG. 1 represents the results of the variation in transmittance determined for the variable-transmittance glass (made by "C" company of the United States and now available on the market) under the same conditions as mentioned above. Comparison clearly shows that the glass manufactured according to the present invention excels over the conventional products now available on the market.

TABLE 1

| | Principal constituents (percent by weight) | | | | | | Additive constituents (percent by weight) | | | | Transformation point, °C |
|---|---|---|---|---|---|---|---|---|---|---|---|
| | $SiO_2$ | $Al_2O_3$ | $B_2O_3$ | $Na_2O$ | $K_2O$ | $Li_2O$ | Ag | Cl | Br | CuO | |
| I | 60.9 | 9.4 | 20.8 | | 6.8 | 2.1 | 0.5 | 1.3 | 0.2 | 0.015 | 465 |
| II | 60.9 | 9.4 | 20.8 | 8.9 | | | 0.5 | 1.3 | 0.2 | 0.015 | 510 |

Note.—The values for the additive constituents are in terms of percent by weight based on the combined weight of the principal constituents taken as unity (100% by weight.)

EXAMPLE 2

A mixture of the same kinds of raw materials as used in the glass I of Example 1 was melted in a clay crucible at 1400° C. for 2 hours and thereafter molded to the shape of a plate. Thus was obtained a glass III plate having the composition and the transformation point shown in Table 2. For the purpose of comparing the variation in transmittance, there were also prepared a glass IV plate using cesium carbonate and a glass V plate using sodium carbonate respectively in the place of potassium bromide and potassium carbonate used in the aforementioned composition.

The glass III, IV and V plates thus obtained were given a thickness of 2 mm., subjected to the heat treatment under varying conditions so as to determine the variation in transmittance by the same procedure as in Example 1. The results are shown in FIG. 2.

The curve E represents the results of the variation in transmittance determined for the glass III of Table 2, which was first heated at 600° C. for one hour in the first stage of heat treatment, then heated at 450° C. for five hours in the second stage of treatment, cooled to room temperature and thereafter subjected to exposure in the same procedure as in Example 1 at 20° C.

The curve F represents the results of the variation in transmittance determined for the glass IV of Table 2, which was subjected to the two-stage heat treatment as in the case of the aforementioned glass III and then to the same exposure test.

The curve G represents the results of the variation in transmittance determined for the glass V of Table 2, which was heated first at 580° C. for one hour in the first stage and then at 450° C. for 40 hours in the second stage, thereafter cooled to room temperature and subjected to the exposure test in the same procedure as in Example 1.

From FIG. 2, it is clear that the variable-transmittance glass which has the aforementioned specific composition and which has undergone the two-stage heat treatment enjoys a high response speed to light and that the glass which does not have the aforementioned specific composition fails to provide a satisfactory response speed to light even when it is subjected to the two-stage heat treatment.

TABLE 2

| | Principal constituents (percent by weight) | | | | | | | Additive constituents (percent by weight) | | | | Transformation point, °C. |
|---|---|---|---|---|---|---|---|---|---|---|---|---|
| | $SiO_2$ | $Al_2O_3$ | $B_2O_3$ | $Na_2O$ | $K_2O$ | $Li_2O$ | $Cs_2O$ | Ag | Cl | Br | CuO | |
| III | 55.5 | 7.9 | 24.3 | | 8.9 | 3.4 | | 0.3 | 1.1 | 0.1 | 0.012 | 460 |
| IV | 55.0 | 9.0 | 24.0 | | | 4.0 | 8.0 | 0.3 | 1.1 | | 0.015 | 480 |
| V | 58.5 | 8.2 | 23.5 | 5.0 | | 4.8 | | 0.3 | 1.1 | | 0.012 | 470 |

We claim:
1. A variable-transmittance glass, having a high response speed to light, consisting essentially of 50–70% of $SiO_2$, 10–26% of $B_2O_3$, 6–14% of $Al_2O_3$ and 5–15% of alkali metal oxides including $K_2O$ and $Li_2O$ in a ratio of from 1:0.1 to 1:0.7, with the content of other alkali metal oxides kept below the $Li_2O$ content, all of which make a total of 100%, plus 0.05–1.0% of Ag, at least an equivalent percentage of at least one halogen to the percentage of Ag to form silver halide crystals, and 0.005–0.03% of CuO, all percentages being by weight.

2. The variable-transmittance glass of claim 1, wherein the weight of the halogen is greater than that of the silver.

3. The variable-transmittance glass of claim 1, comprising at least two kinds of halogens.

References Cited
UNITED STATES PATENTS

| | | | |
|---|---|---|---|
| 3,197,296 | 7/1965 | Eppler et al. | 106—Dig. 006 |
| 3,449,103 | 6/1969 | Stookey | 106—Dig. 006 |
| 3,656,923 | 4/1972 | Garfinkel | 106—Dig. 006 |

ALLEN B. CURTIS, Primary Examiner

M. L. BELL, Assistant Examiner

U.S. Cl. X.R.

106—Dig. 008